(12) United States Patent
Todd

(10) Patent No.: US 6,324,303 B1
(45) Date of Patent: Nov. 27, 2001

(54) METHOD AND APPARATUS FOR CODING INFORMATION

(75) Inventor: Martin Peter Todd, Uxbridge (GB)

(73) Assignee: Central Research Laboratories Limited, Middlesex (GB)

( * ) Notice: Subject to any disclaimer, the term of this patent is extended or adjusted under 35 U.S.C. 154(b) by 0 days.

(21) Appl. No.: 09/242,101
(22) PCT Filed: Aug. 1, 1997
(86) PCT No.: PCT/GB97/02060
 § 371 Date: Jun. 22, 1999
 § 102(e) Date: Jun. 22, 1999
(87) PCT Pub. No.: WO98/06216
 PCT Pub. Date: Feb. 12, 1998

(30) Foreign Application Priority Data

Aug. 7, 1996 (GB) .................................................. 9616571

(51) Int. Cl.⁷ ....................................................... G06K 9/36
(52) U.S. Cl. ............................................. 382/232; 382/242
(58) Field of Search .................................... 382/232, 242, 382/266, 600; 235/462.27; 348/396.1; 358/539

(56) References Cited

U.S. PATENT DOCUMENTS 4,908,698 * 3/1990 Enomoto et al. ...................... 358/13
5,734,152 * 3/1998 Goren et al. .......................... 235/462

FOREIGN PATENT DOCUMENTS

0581317 A2 * 2/1994 (EP) ............................... G07D/7/00

OTHER PUBLICATIONS

Spreeuwers et al., "Evaluation of Edge Detectors Using Average Risk", Pattern Recognition, vol. III, Conference C: Image, Speech and Signal Proceedings, pp. 771–774, 1992.*

* cited by examiner

Primary Examiner—Jose L. Couso
Assistant Examiner—Anh Hong Do
(74) Attorney, Agent, or Firm—Crowell & Moring LLP

(57) ABSTRACT

A method for inserting coded information into an image comprising the steps of analyzing the image, identifying the edge regions within the image, determining the strength of the edge region, and producing an edge function which is dependent on the strength of the edge. The edge function is added to the image in order to represent coded information.

14 Claims, 3 Drawing Sheets

METHOD AND APPARATUS FOR CODING INFORMATION

BACKGROUND AND SUMMARY OF THE INVENTION

The present invention relates to a method and apparatus for the insertion, and subsequent decoding, of coded information into images.

It is known to insert codes into images for example video transmissions or video clips or stills transmitted across a telecommunication link, for the purpose of identifying the owner of the images. There are a number of known schemes for inserting identification codes into the sync periods, and more recently it has been proposed to insert identification codes into the image itself, but in such a manner that the code cannot be detected by the eye.

WO 95/14289 discloses the embedding of an identification code throughout an image by modulating a digitised version of the image with a small noise signal. The specific system described suffers from the disadvantage of requiring to have to hand the original image for code identification. Further improvements in code robustness for transmission over telecommunications links or broadcasting are also desirable.

WO 95/20291 discloses a method of hiding copyright related messages with a digital. data work, which relies on commonly occurring patterns or sequences of data in the work acting as signposts to target data elements which are modified according to certain rules. The disclosed method suffers from a lack of robustness to signal degradation.

The above references suffer from a disadvantage that they are concerned wholly or principally with the digital domain, and the disclosed techniques are not suited to the analog domain, in particular where digital to analog conversion and analog to digital conversion may easily lose or degrade individual pixel values.

In our copending application PCT/GB96/00246 (the national phase entry of which is U.S. application Ser. No. 08/875,546, filed Jul. 31, 1997), there is disclosed and claimed a method for inserting coded information into an image, comprising analysing the image, identifying strongly featured regions and inserting coded information into these regions. Because the method relies on an analysis of the entire image and code being inserted in strongly featured regions, rather than in individual pixels, as in the prior art, the code is better able to survive analog to digital conversions and digital to analog conversions, where there will inevitably be pixel misalignments between the original and processed images, and hence the pixel values will be apparently altered.

By "strongly featured regions" is meant regions of primary strength to which the eye responds in viewing an image, for example, textured regions or lines or boundaries between two regions of different luminance. In such regions, it is possible to insert a relatively large amount of information without significantly altering the image in its appearance to the eye. Edge regions between areas of different luminance are preferred since these are very distinctive and will permit code insertion without visibly degrading the image, and the coded information is inserted into such strongly featured regions by altering the structure of the image in such region in a predictable or identifiable manner. The image is altered by applying an insert function to an area including the strongly featured region, which insert function gradually decreases in intensity from the centre of its region of application, so as to blend with the surrounding region.

A main advantage of applying the coded information by altering the image in a predictable or identifiable manner, is that the information can be recovered in a decoding process at a remote location without having the original to hand.

As disclosed in PCT GB96/00246 the image, for example, a video frame or field, is divided up into a number M×N of blocks in M rows and N columns, each block comprising nxn pixel elements (e.g. 8×8). Strongly featured regions are searched in each block for insertion of code. In order to encode a significant amount of information into an image, it is necessary to apply the insertion function to a number of edges in the image. If for example, one edge is chosen in each block into which the image is divided, then in order to increase confidence when attempting to recognise the code, the edges in one row may be encoded according to two separate pseudo-random codes, representing a "1" or "0".

Prior to inserting the information, the image is assessed as to whether the image is suitable for code insertion, for example, the degree of consistency of the edge, the definition of the edge centre to prevent insertions when the image is determined to be unsuitable. Problems have arisen in the method described in PCT/GB96/00246 where more than one distinct edge is present in the image, or the part of the image under consideration for code insertion; for example there may be a corner feature.

An object of the present invention is to provide a method of embedding coded information into images by adding into the image a function which is dependant on the edge activity in the image.

The present invention accordingly provides in one aspect a method for inserting coded information into an image, comprising the steps of analysing the image, identifying edge regions calculating the strength of the detected edge and producing an edge function dependent on the strength of the edge, and adding the edge function to the image in order to represent coded information.

In accordance with the present invention, an image (or block within an image) may be selected to be encoded using an edge detection based scheme, the selection being dependant on the edge activity in the block. This allows for encoding of blocks with multiple features such as blocks containing a corner or block containing two edges. In these blocks, an edge detection scheme is applied to the block to produce a function within the block which has a value at each pixel, which is related to the strength of the edge at that pixel. This edge function is suitably scaled, and optionally multiplied by a circular function centred on the centre of the block. The scaled edge function is then added to the image on a pixel by pixel basis, with the sign of the function, plus or minus, representing a "1" or "0" bit of information. In a decoding operation, edges are detected and an estimate is made of the appropriate edge function. This estimate is then correlated with the image in order to reveal the existence of coded information.

In another aspect, the invention provides a method of decoding information contained in an image, the method comprising analysing the image, identifying edge regions and providing an estimate of the edge function dependent on the strength of the edge, and correlating the estimated edge function with the image in order to identify coded information present within the image.

As preferred, the image may be divided into M×N blocks, and an encoding/decoding operation is carried out on each block. Further, in accordance with the invention, an assessment is made of the type of features present in the image or image block, and a coding function is added to the image, the type of function depending on the type of image, as more fully described in our Application PCT/GB96/00246. Thus if only a single main edge is present, then an elliptical function may be added centred on the edge, if no distinct feature is present, then a circular function may be added, and if more than one distinct edge is present, then the edge function of the present invention may be added.

Another aspect of the present invention concerns synchronising the decoding process. An encoded image may be presented to the decoder in a geometrically altered state from which it was encoded. The geometric transformation may be for example an offset (x,y) translation, or a scaling in one or both axes (including different scaling in each axis), or a rotation. If the geometric transformation is of a significant size, then in order to decode it, this geometric distortion must be accounted for. The decoder synchronising process achieves this by an analysis process involving splitting the image into blocks, analysing the blocks for the type of insert and decoding the block accordingly. The process produces a measure of coded insets and their centres and the regularity of their structure. The offsets, scaling and rotations are then calculated from the geometric variations of the centres and structure. This is then used to correct the image before the final decoding.

BRIEF DESCRIPTION OF THE DRAWINGS

A preferred embodiment of the invention will now be described with reference to the accompanying drawing wherein.

DESCRIPTION OF THE PREFERRED EMBODIMENT

Figure 1:
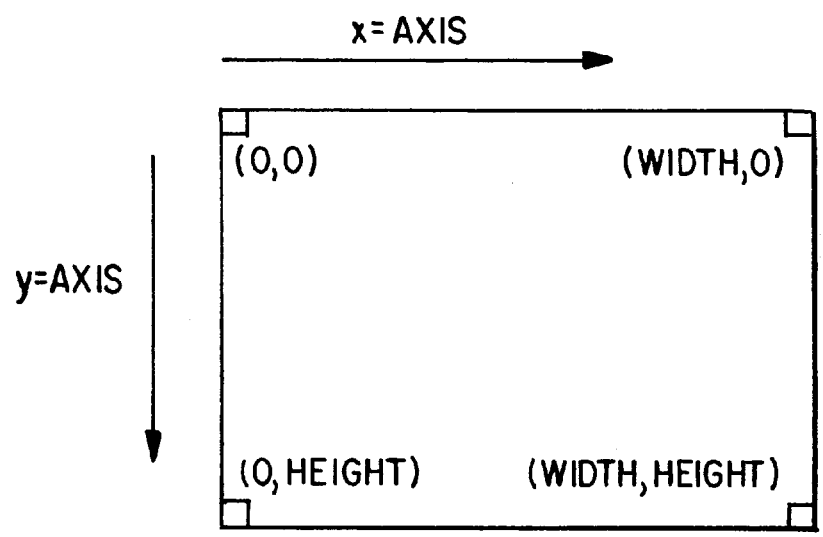
FIGS. 1 to 3 are diagrams for explaining the preferred method of the present invention.

The encoding and decoding algorithms of the preferred embodiment are listed below as a sequence of steps:

Encoding Algorithm
1) split the frame into M*N adjacent blocks each of n*n pixels
2) calculate the local orientation for each pixel in each block
3) calculate the edge detection function for each block.
4) calculate the dominant orientation for each block, the amount of activity in each block, and the consistency of the dominant orientation
5) to encode one data bit process each block within a predefined set of blocks distributed throughout the image, as follows:
   5a) look up the next element of the PRS (psuedo random sequence) for the data bit
      1) if it is a 1 set to add
      2) if it is a-1 set to subtract
   5b) segment the blocks in the following categories
      a) a single edge/line in a dominant orientation
      b) a low activity block
      c) several major lines or edges
   5c) process the blocks as follows:-
      a) add/subtract an elliptical function
         a1) centred on the edge
         a2) aligned to the block orientation
         a3) scaled by the activity in the block
      b) add/subtract a circular function
         b1) centred on the centre of the block
         b2) fixed strength
      c) add/subtract the edge detection function
         c1) centred on the centre of the block, and modulated by a circular function.
         c2) scaled to bring it within the magnitude range of the elliptical function in a).
6) repeat step 5) until all the bits are encoded.

Decoding Algorithm
1) split the frame into M*N adjacent blocks each of n*n pixels
2) calculate the local orientation for each pixel in each block
3) calculate the edge detection function for each block.
4) calculate the dominant orientation for each block, the amount of activity in each block, and the consistency of the dominant orientation
5) to decode one data bit process each block within the predefined set of blocks distributed throughout the image, as follows:-
   5a) segment the blocks in the following categories
      a) a single edge/line in a dominant orientation
      b) a low activity block
      c) several major lines or edges
   5b) process the blocks as follows:-
      a) calculate the concave/convex-ness of an elliptical function
         a1) centred on the edge
         a2) aligned to the block orientation
         a3) scaled by the activity in the block
      b) calculate the concave/convex-ness of a circular function
         b1) centred on the centre of the block
         b2) fixed strength
      c) calculate the concave/convex-ness of an edge detection function
         c1) centred on the centre of the block and modulated by a circular function
         c2) scaled to bring it within the magnitude range
   5c) correlate the convex/concave-ness of the block with the next element of the data bit 1 PRS and accumulate the result.
   5d) correlate the convex/concave-ness of the block with the next element of the data bit 0 PRS and accumulate the result.
6) compare the data bit 1 accumulated correlation with the data bit 0 accumulated correlation. The larger of the two is the decoded data bit. The size of the correlation is the confidence in the result.
7) repeat steps 5) and 6) for each data bit.

Figure 2:
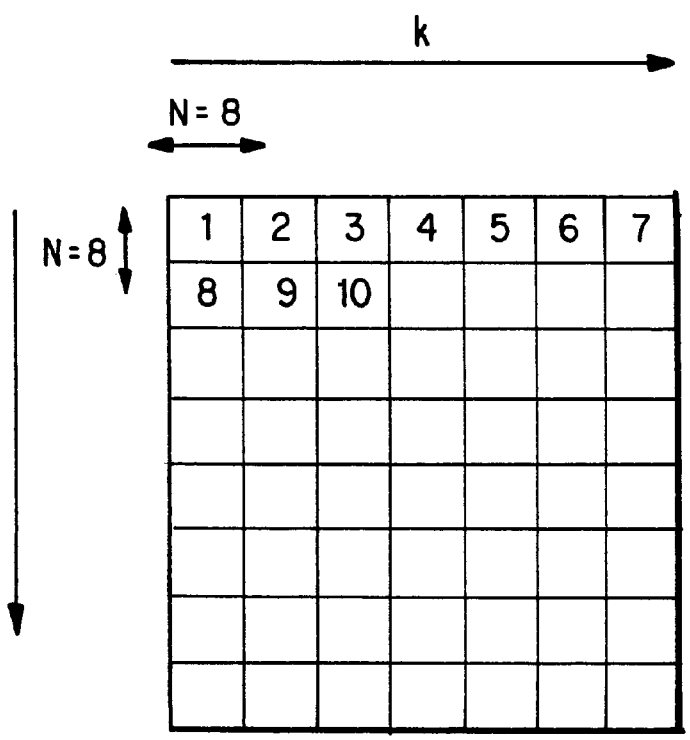
Figure 3:
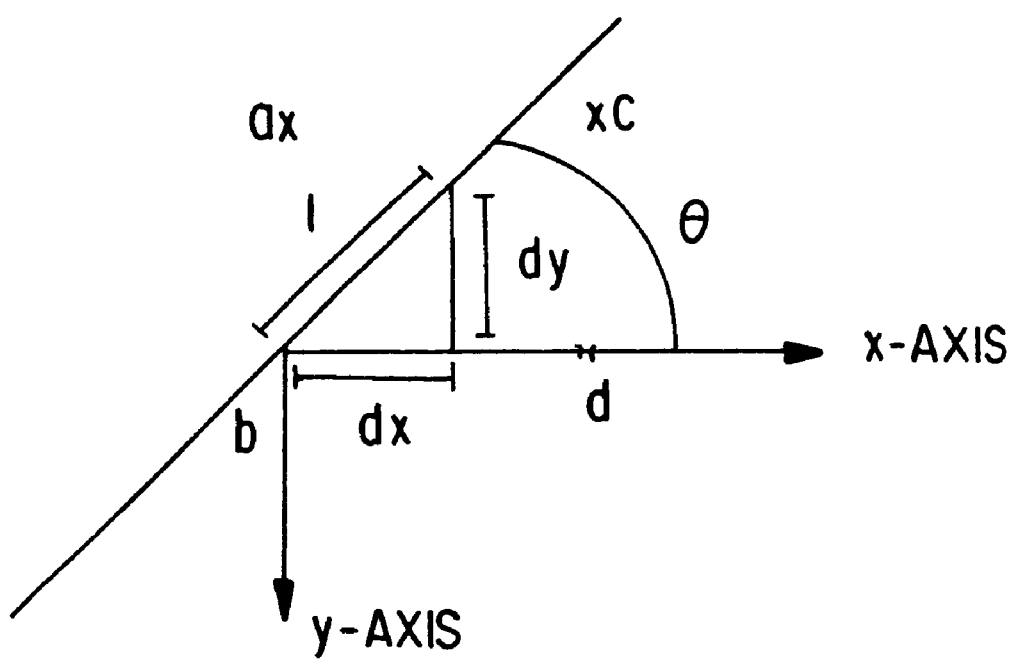
Figure 4:
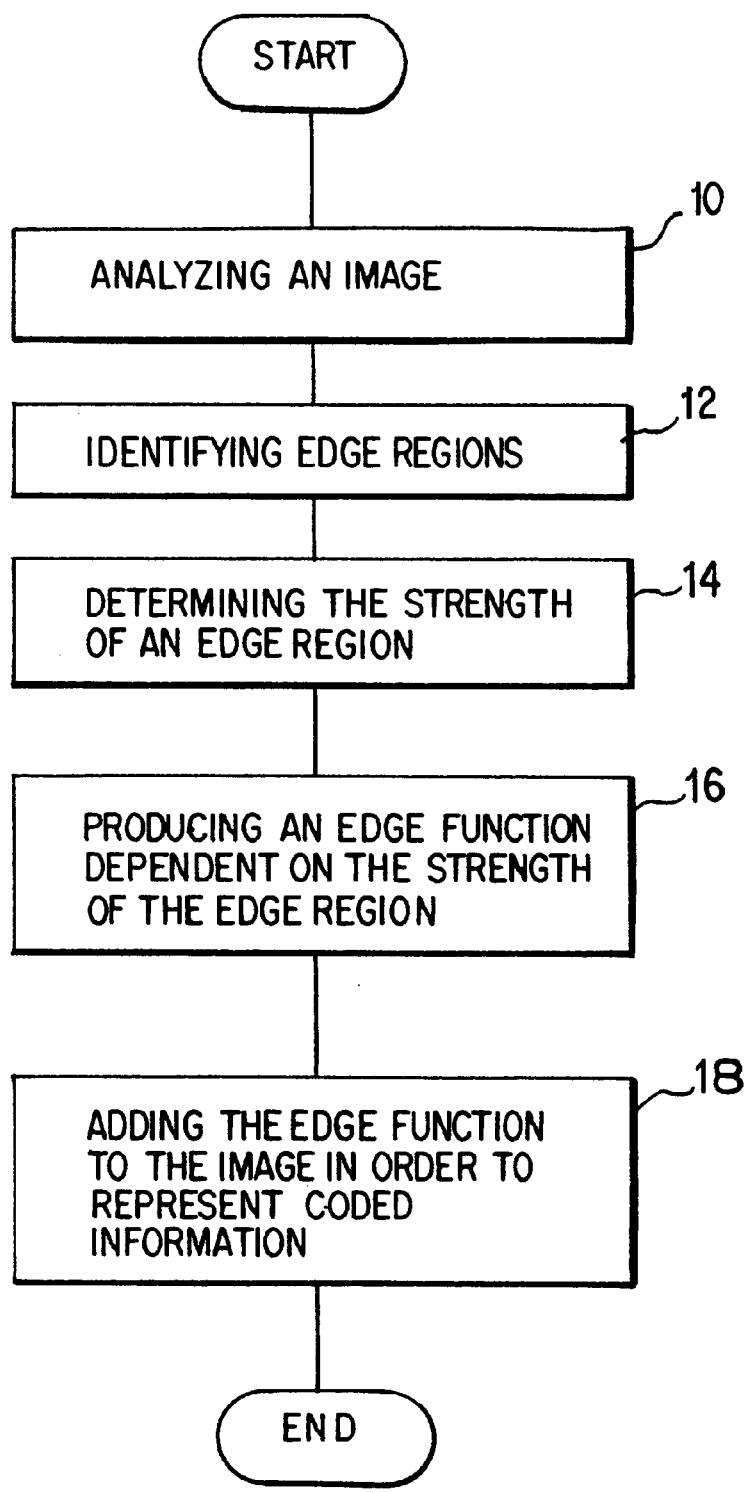
FIG. 4 is a flowchart illustrating the operation of the invention.

Referring now to FIGS. 1 to 3, the frame axis conventions used to describe the mathematics are shown in FIG. 1. A pixel is defined by its coordinates (x,y) and its luminance value is r(x,y). Note that the top left pixel of an image is the (0,0) pixel, and that the y axis has its positive direction down the frame.

As shown in FIG. 2, the frame is segmented into non-overlapping blocks, each block being of size n by n pixels. Smaller values of n mean that it is more likely that only a single edge will be found in any given block. It also means that more individual blocks will be available for the correlation process. Larger values of n mean that larger, and therefore more robust, insertions can be made. In practice a good choice of n is 8. The block axis conventions used in segmenting the frame are shown in FIG. 2.

Referring to FIG. 3, the local orientation for each point in the frame is calculated from four surrounding points by a process as described below. This gives a vector at each point in the frame, with the magnitude of the vector representing the strength of the feature, and the angle representing twice the local orientation. This is illustrated in FIG. 3. Thus the local orientation gives a measure of gradient of luminance in a particular direction within the block. A very large value of orientation indicates the existence of an edge; In this double angle form, the vectors can be vector-averaged over a block, to give the local orientation for the block. This provides a relatively fast estimating algorithm.
e.g., as shown in FIG. 3:

θ~−45 degrees: by convention, θ is associated with point
  a=(x,y)
  −dx~0.7
  −dy~−0.7
θ is estimated from
  a=r(x,y)
  b=r(x,y+1)
  c=r(x+1,y)
  d=r(x+1,y+1)
  e=d−a
  f=b−c
  Re=−2*e*f
  Im=e²−f²

$$\theta = \frac{1}{2}\text{Tan}^{-1}\left(\frac{\text{Im}}{\text{Re}}\right)$$

θ is in single angle form
Re,Im are in double angle form
orientations are averaged in the Re,Im double angle form.

In the present invention, the measurement of luminance gradient is employed not only to give an assessment of the type of image in the block, and for determining the location of edges within the block as disclosed in PCT/GB96/00246, but also to determine the value of the edge detection function which is to be added to the image information in order to insert coded information within the image.

The edge detection function is calculated by taking the magnitudes of the orientation-vectors for each pixel, then for each pixel the average of the magnitudes of it's neighbours is calculated. I.e. for pixels (a) to (t) arranged in 4 rows of 5 columns, thus:

| a | b | c | d | e | the averages are calculated as shown | 0 | 0 | 0 | 0 | 0 |
|---|---|---|---|---|---|---|---|---|---|---|
| f | g | h | i | j | | 0 | (a+b+f+g)/4 | (b+c+g+h)/4 | (c+d+h+i)/4 | |
| k | l | m | n | o | | 0 | (f+g+k+l)/4 | (g+h+l+m)/4 | (h+i+m+n)/4 | |
| p | q | r | s | t | | 0 | (k+l+p+q)/4 | (l+m+q+r)/4 | ⋯ etc. | |

The average magnitude for each pixel is then multiplied by a circular function centred on the center of the block. The edge detection function has a single number per pixel in the block but with the outer pixels set to zero. This is to say, that in the example discussed above, the edge detection function for pixels (a) to (e), (f), (j), (k), (o) and (p) to (t) are set to zero. This gives a pattern of values for the edge function thus:

| 0 | 0 | 0 | 0 | 0 | 0 | 0 | 0 |
|---|---|---|---|---|---|---|---|
| 0 | 0.0 | 0.0 | 0.0 | 0.2 | 0.0 | 0.0 | 0 |
| 0 | 0.1 | 0.2 | 0.0 | 0.6 | 0.1 | 0.0 | 0 |
| 0 | 0.1 | 0.1 | 0.0 | 0.9 | 0.0 | 0.1 | 0 |
| 0 | 0.1 | 0.2 | 0.0 | 0.7 | 0.0 | 0.1 | 0 |
| 0 | 0.1 | 0.2 | 0.0 | 0.1 | 0.0 | 0.1 | 0 |
| 0 | 0 | 0 | 0 | 0 | 0 | 0 | 0 |

The edge detection function is scaled to get it in the range 0.0 to 1.0, so that it is in the same range as an elliptical function calculated for blocks having just a single dominant edge as described in PCT/GB96/00246. This is done by taking the magnitude at each pixel, scaling it by a fixed factor, and limiting it between zero and a fixed factor.

The scale edge detection function is then added to the original image.

What is claimed is:

1. A method for inserting coded information into an image, comprising the steps of analysing the image, identifying edge regions, determining the strength of the edge region and producing an edge function which is dependent on the strength of the edge, and adding the edge function to the image in order to represent coded information.

2. A method according to claim 1, further comprising the step of dividing up the image into M*N blocks of pixels, and performing the aforesaid steps in each block of the image.

3. A method according to claim 1, further comprising the steps of dividing the image into a plurality of blocks of m×n pixels (where m and n are any whole number), calculating orientation vectors for each pixel in each block and calculating the average magnitude of the vector for each selected pixel by calculating the average of the vector magnitudes of a plurality of pixels immediately adjacent the selected pixel, scaling the average magnitude of the vector for each selected pixel to produce a scaled edge function, and adding the scaled edge function to the image to represent coded information.

4. A method according to claim 3 wherein the average magnitude of the vector for each selected pixel is multiplied by a circular function centred on the centre of each block to produce an edge function, the edge function is scaled to produce a scaled edge function, and the scaled edge function is added to the image to represent coded information.

5. A method according to claim 2, further comprising the steps of dividing the image into a plurality of blocks of m×n pixels (where m and n are any whole number), calculating orientation vectors for each pixel in each block and calculating the average magnitude of the vector for each selected pixel by calculating the average of the vector magnitudes of a plurality of pixels immediately adjacent the selected pixel, scaling the average magnitude of the vector for each selected pixel to produce a scaled edge function, and adding the scaled edge function to the image to represent coded information.

6. A method according to claim 5 wherein the average magnitude of the vector for each selected pixel is multiplied by a circular function centered on the center of each block to produce an edge function, the edge function is scaled to produce a scaled edge function, and the scaled edge function is added to the image to represent coded information.

7. A method of decoding information contained in an image, the method comprising analysing the image, identifying edge regions and providing an estimate of the edge function dependent on the strength of the edge, and combining the estimated edge function with the image in order to identify in a correlation operation coded information present within the image.

8. A method according to claim 7, comprising the step of dividing up the image into M*N blocks of pixels, and performing the aforesaid steps in each block of the image.

9. A method according to claim 7, further comprising the steps of dividing the image into a plurality of blocks of m×n pixels (where m and n are any whole number), calculating orientation vectors for each pixel in each block and calculating the average magnitude of the vector for each selected pixel by calculating the average of the vector magnitudes of a plurality of pixels immediately adjacent the selected pixel, scaling the average magnitude of the vector for each selected pixel to produce a scaled edge function, and adding the scaled edge function to the image to represent coded information.

10. A method according to claim 8, further comprising the steps of dividing the image into a plurality of blocks of m×n pixels (where m and n are any whole number), calculating orientation vectors for each pixel in each block and calculating the average magnitude of the vector for each selected pixel by calculating the average of the vector magnitudes of a plurality of pixels immediately adjacent the selected pixel, scaling the average magnitude of the vector for each selected pixel to produce a scaled edge function, and adding the scaled edge function to the image to represent coded information.

11. A method according to claim 9, wherein the average magnitude of the vector for each selected pixel is multiplied by a circular function centered on the center of each block to produce an edge function, the edge function is scaled to produce a scaled edge function, and the scaled edge function is added to the image to represent coded information.

12. A method according to claim 10, wherein the average magnitude of the vector for each selected pixel is multiplied by a circular function centered on the center of each block to produce an edge function, the edge function is scaled to produce a scaled edge function, and the scaled edge function is added to the image to represent coded information.

13. A method of decoding information contained in an image, the method comprising analysing the image, identifying strongly featured regions, determining for at least one such region an anticipated insertion of coded information, and combining such anticipated insertion with the image to determine in a correlation operation whether there has been inserted into the strongly featured region coded information, wherein in order to take account of geometric transformation of the image to be decoded, an inital decoding operation is carried out to determine the periodicity and/or regularity of the anticipated insertions, whereby to determine any such geometric transformation.

14. A method of decoding according to claim 13, comprising the steps of splitting the image into blocks, analysing the blocks for the type of insert, decoding the blocks to produce a measure of coded inserts and their centres and the regularity of their structure, calculating offsets, scaling and rotation from the geometric variations of the centres and structure and correcting the image prior to decoding the embedded codes.

\* \* \* \* \*